(12) United States Patent
Naik et al.

(10) Patent No.: US 11,983,569 B2
(45) Date of Patent: May 14, 2024

(54) SERVICES THREAD SCHEDULING BASED UPON THREAD TRACING

(71) Applicant: International Business Machines Corporation, Armonk, NY (US)

(72) Inventors: Priyanka Prakash Naik, Mumbai (IN); Kavya G, Chennai (IN); Chander Govindarajan, Chennai (IN); Sayandeep Sen, Bangalore (IN); Palanivel Andiappan Kodeswaran, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 17/405,885

(22) Filed: Aug. 18, 2021

(65) Prior Publication Data

US 2023/0058090 A1 Feb. 23, 2023

(51) Int. Cl.
| | |
|---|---|
| G06F 9/50 | (2006.01) |
| G06F 9/455 | (2018.01) |
| G06F 9/48 | (2006.01) |
| G06F 11/34 | (2006.01) |
| G06N 5/01 | (2023.01) |

(Continued)

(52) U.S. Cl.
CPC ........ *G06F 9/5038* (2013.01); *G06F 9/45558* (2013.01); *G06F 9/4881* (2013.01); *G06F 9/5072* (2013.01); *G06F 9/5077* (2013.01); *G06F 11/3409* (2013.01); *G06N 5/01* (2023.01); *G06N 5/04* (2013.01); *G06N 20/00* (2019.01); *G06F 2009/4557* (2013.01); *G06F 2009/45591* (2013.01); *G06F 2209/505* (2013.01); *G06F 2209/508* (2013.01)

(58) Field of Classification Search
None
See application file for complete search history.

(56) References Cited

U.S. PATENT DOCUMENTS

| | | |
|---|---|---|
| 6,549,930 B1 | 4/2003 | Chrysos et al. |
| 7,360,218 B2 | 4/2008 | Accapadi et al. |

(Continued)

OTHER PUBLICATIONS

Liu, Pinchao, Liting Hu, Hailu Xu, Zhiyuan Shi, Jason Liu, Qingyang Wang, Jai Dayal, and Yuzhe Tang. "A Toolset for Detecting Containerized Application's Dependencies in CaaS Clouds." In 2018 IEEE 11th International Conference on Cloud Computing (Cloud), pp. 194-201. IEEE, 2018. (Year: 2018).*

(Continued)

*Primary Examiner* — Frank D Mills
(74) *Attorney, Agent, or Firm* — Eric W. Chesley (57) ABSTRACT

One embodiment provides a method, including: producing, for each of a plurality of containers, a resource profile for each thread in each of the plurality of containers; identifying, for each of the plurality of containers and from, at least in part, the resource profiles, container dependencies between threads on a single of the plurality of containers; determining service dependencies between threads across different of the plurality of containers; scheduling, based upon the container dependencies and the service dependencies, threads to cores, wherein the scheduling is based upon minimizing thread processing times; and publishing the container dependencies and the service dependencies on a registry of the node clusters.

18 Claims, 5 Drawing Sheets

(51) Int. Cl.
*G06N 5/04* (2023.01)
*G06N 20/00* (2019.01)

(56) References Cited

U.S. PATENT DOCUMENTS

| | | | |
|---|---|---|---|
| 8,458,136 | B2 | 6/2013 | Krutyolkin et al. |
| 8,839,255 | B2 | 9/2014 | Memik et al. |
| 9,557,879 | B1* | 1/2017 | Wang .................... H04L 41/145 |
| 2009/0320021 | A1 | 12/2009 | Pan et al. |
| 2018/0210801 | A1* | 7/2018 | Wu .......................... H04L 43/20 |
| 2020/0257968 | A1* | 8/2020 | Mitra .................... G06F 9/4881 |
| 2021/0211408 | A1* | 7/2021 | Porras ................. G06F 11/3409 |

OTHER PUBLICATIONS

Henry Qin et al., "Arachne: Core-Aware Thread Management", 13th USENIX Symposium on Operating Systems Design and Implementation (OSDI'18), Oct. 8-10, 2018, Carlsbad, CA, USA, 17 pages, USENIX Association.

Josep M. Perez et al., "A Dependency-Aware Task-Based Programming Environment for Multi-Core Architectures", 2008 IEEE International Conference on Cluster Computing, 2008, 10 pages, IEEE Digital Library.

Samuel Thibault et al., "Building Portable Thread Schedulers for Hierarchical Multiprocessors: the BubbleSched Framework", EuroPar, Aug. 2007, Rennes, France, 12 pages, HAL.

Disclosed Anonymously, "An Open MP Extension for Architecture Aware Thread Scheduling", ip.com Prior Art Database Technical Disclosure, IP.com No. IPCOM000146571D, Feb. 16, 2007, 4 pages, ip.com.

Takafumi Kubota et al., "Logging Inter-Thread Data Dependencies in Linux Kernel", IEICE Trans.Inf. & Syst., Jul. 2020, 14 pages, vol. E103-D, The Institute of Electronics, Information and Communication Engineers.

Redha Gouicem, "Thread Scheduling in Multi-core Operating Systems", Computer Science, Sor-bonne Universite, 2020, 174 pages, HAL.

Yoongu Kim et al., "Thread Cluster Memory Scheduling: Exploiting Differences in Memory Access Behavior", 2010 43rd Annual IEEE/ACM International Symposium on Microarchitecture, 2010, 12 pages, IEEE Computer Society.

Panayiotis Petrides et al., "Heterogeneous- and NUMA-aware Scheduling for Many-core Architectures", SYSTOR '17, May 22-24, 2017, Haifa, Israel, 12 pages, ACM Digital Library.

\* cited by examiner

SERVICES THREAD SCHEDULING BASED UPON THREAD TRACING

BACKGROUND

Many different applications use different services for performing functions of the applications. For example, telecommunications applications use many different services to perform the functions required of the telecommunications application. These services are often split across different components due to size. Conventionally, the different services have been hosted on different hardware component. The hardware components would be optimized based upon the service that may be running on it. For example, if the service is memory or processing intensive, the hardware component would be configured to account for the extra requirements. Now these services are being moved to cloud environments, and specifically, containers on the cloud environments. This means that the services that need to communicate with other services, communicate between the different cloud containers.

BRIEF SUMMARY

In summary, one aspect of the invention provides a method, including: producing, for each of a plurality of containers, a resource profile for each thread in each of the plurality of containers, wherein each thread is associated with an application hosted on a virtual environment, wherein subsets of the plurality of containers are associated with cores including resources for use by containers, wherein sets of containers are assigned to a node within a node cluster; identifying, for each of the plurality of containers and from, at least in part, the resource profiles, container dependencies between threads on a single of the plurality of containers; determining service dependencies between threads across different of the plurality of containers; scheduling, based upon the container dependencies and the service dependencies, threads to cores, wherein the scheduling is based upon minimizing thread processing times; and publishing the container dependencies and the service dependencies on a registry of the node clusters.

Another aspect of the invention provides an apparatus, including: at least one processor; and a computer readable storage medium having computer readable program code embodied therewith and executable by the at least one processor; wherein the computer readable program code is configured to produce, for each of a plurality of containers, a resource profile for each thread in each of the plurality of containers, wherein each thread is associated with an application hosted on a virtual environment, wherein subsets of the plurality of containers are associated with cores including resources for use by containers, wherein sets of containers are assigned to a node within a node cluster; wherein the computer readable program code is configured to identify, for each of the plurality of containers and from, at least in part, the resource profiles, container dependencies between threads on a single of the plurality of containers; wherein the computer readable program code is configured to determine service dependencies between threads across different of the plurality of containers; wherein the computer readable program code is configured to schedule, based upon the container dependencies and the service dependencies, threads to cores, wherein the scheduling is based upon minimizing thread processing times; and wherein the computer readable program code is configured to publish the container dependencies and the service dependencies on a registry of the node clusters.

An additional aspect of the invention provides a computer program product, including: a computer readable storage medium having computer readable program code embodied therewith, the computer readable program code executable by a processor; wherein the computer readable program code is configured to produce, for each of a plurality of containers, a resource profile for each thread in each of the plurality of containers, wherein each thread is associated with an application hosted on a virtual environment, wherein subsets of the plurality of containers are associated with cores including resources for use by containers, wherein sets of containers are assigned to a node within a node cluster; wherein the computer readable program code is configured to identify, for each of the plurality of containers and from, at least in part, the resource profiles, container dependencies between threads on a single of the plurality of containers; wherein the computer readable program code is configured to determine service dependencies between threads across different of the plurality of containers; wherein the computer readable program code is configured to schedule, based upon the container dependencies and the service dependencies, threads to cores, wherein the scheduling is based upon minimizing thread processing times; and wherein the computer readable program code is configured to publish the container dependencies and the service dependencies on a registry of the node clusters.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-5. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 5. In accordance with an example embodiment, most if not all of the process steps, components and outputs discussed with respect to FIGS. 1-4 can be performed or utilized by way of a processing unit or units and system memory such as those indicated, respectively, at 16' and 28' in FIG. 5, whether on a server computer, a client computer, a node computer in a distributed network, or any combination thereof.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resource but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
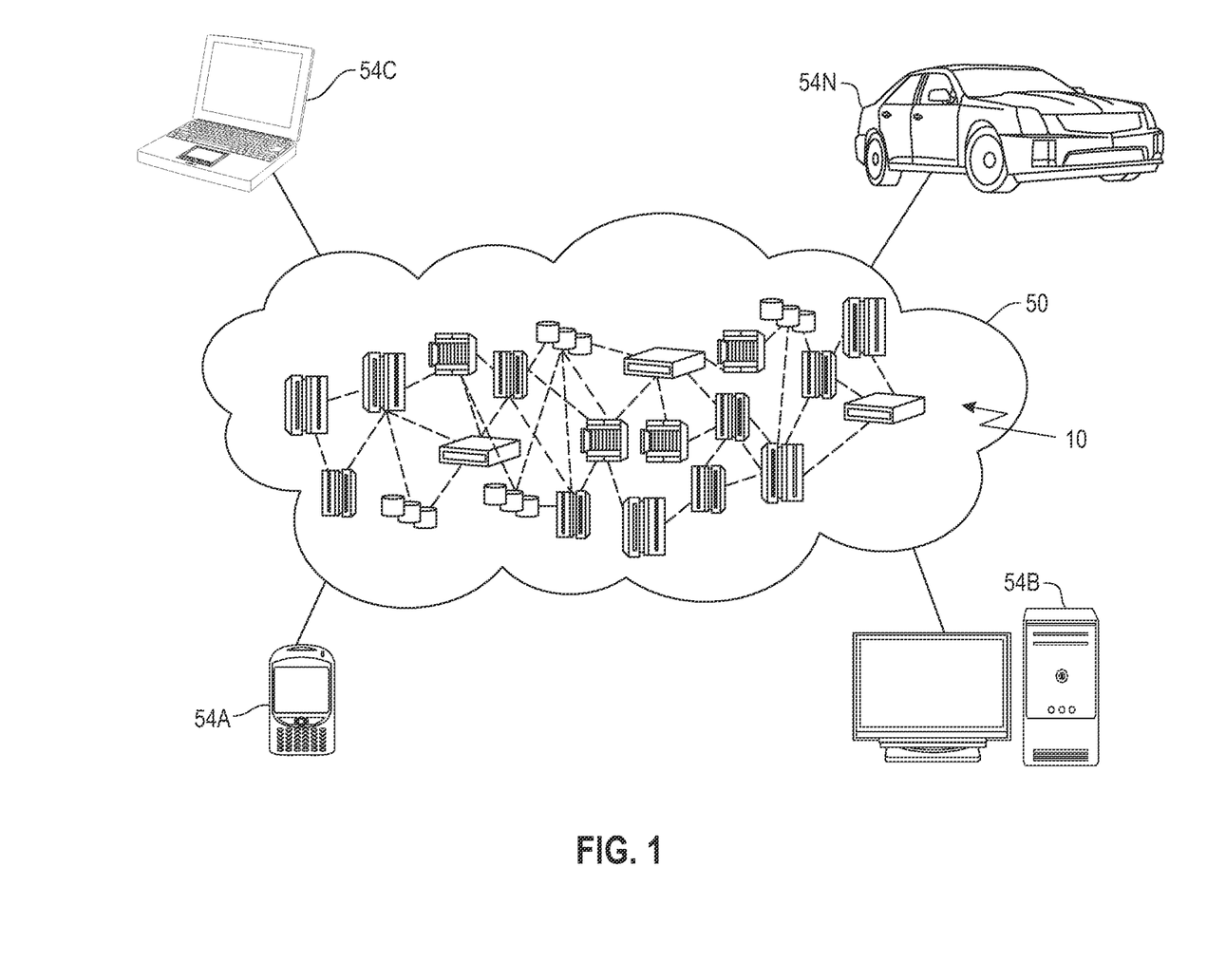
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
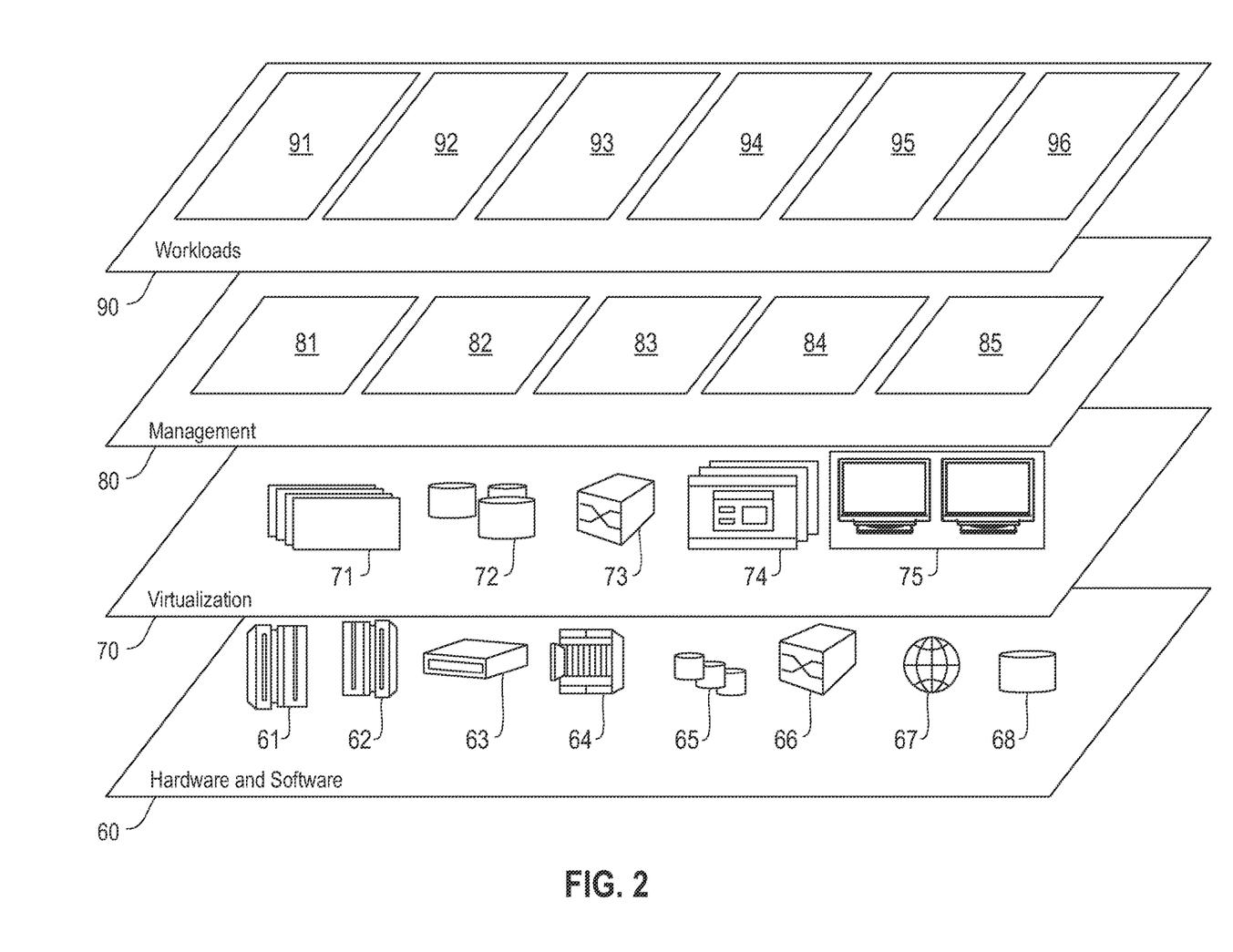
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and service hosting and container provision 96.

The problem with having multiple containers and services communicating among each other across nodes and containers is that communication times increase. In applications that are employing the cloud container environment, increasing communication times for services to communicate with each other can severely impact the overall performance of the application due to the large number of communications that occur in the application. Thus, it is desirable to strategically assign services to nodes and containers so as to shorten the communication times between services that communicate frequently. It is also desirable to share resources among different services. While existing frameworks allow the system to track a single request across a series of services or containers, the existing techniques do not track the different sequences of records through threads of the containers. In other words, the existing techniques allow for the tracking of requests through services, they do not allow a more granular tracking of requests through threads of the containers.

Since conventional systems do not allow the tracking of requests across threads, services that may benefit from sharing resources which would be identified from tracking the requests across threads, may be assigned to different containers or nodes, thereby causing an increase in response times. Thus, since thread communications are not tracked, the conventional systems do not allow for identification of service dependencies that would be useful in assigning containers to cores providing resources for the containers. This results in services that could share resources being assigned to different cores, thereby increasing resource consumption and response times.

Accordingly, an embodiment provides a system and method for scheduling threads within containers and associated with services to cores having resources for use by threads based upon identified container and service dependencies. The system produces a resource profile for each thread in a container of a cloud or virtual environment. The containers are assigned to nodes within node clusters and subsets of the containers are associated with or assigned to cores that have resources that can be used by the assigned containers. Each of the threads is associated with a service that is hosted on the virtual environment. For clarity, the term container will refer to the smallest unit of application execution and consists of one or more threads. Other similar terms that may be used in the art include service, pod, or replica. The term node will refer to an individual server or part of a server that forms a part of a cluster (node cluster) and that runs multiple containers or services.

Therefore, threads communicate with each other to perform functions of the application, which results in some threads communicating across services and nodes of the environment. Thus, the system identifies, from the resource profiles and for each of the nodes, container dependencies. The container dependencies identify threads that communicate with each other within a single container. The container dependencies may also be identified using resource indicators that are identified from the resource profiles and indicate resources that are used by the threads. While containers may use many different resources, there may only be a few resources that each thread may use extensively. The resource indicators may, therefore, correspond to those resources used by a thread that meet or exceed a particular threshold. The resource indicators can be used to identify resources that are common between threads, thereby assisting in assigning threads to cores.

In addition to the container dependencies, the system identifies service dependencies. The service dependencies identify services that communicate between each other which may be across different containers. The service dependencies can be identified from the resource indicators and thread communications. Additionally, the service dependencies may be identified from application topologies, machine learning models, heuristics, and the like. Once the container and service dependencies are identified, the system can schedule threads to cores in order to minimize thread processing times. By understanding the threads within a container that communicate with each other and the threads across containers that communicate with each other, the system can strategically schedule threads to cores to reduce the communication times between threads. The system can also publish the container and service dependencies to a registry of node clusters so that entire clusters can benefit from the dependency knowledge.

Such a system provides a technical improvement over current systems for thread-to-core scheduling. The system is able to identify container and service dependencies that can be used when assigning services on containers and nodes in order to reduce the response time of the services by reducing the communication times between services. Additionally, by tracking the threads and thread communications, the described system and method is able to schedule or allocate threads to cores in a manner that allows the threads to benefit from sharing resources with other threads. In other words, unlike conventional high-level systems which do not track threads and therefore, do not provide for scheduling at a level any more granular than services scheduling and, low-level system which do not track multiple services, the described system and method allows for a technique to track threads and container and service dependencies based upon the thread tracking and, therefore, allow for more granular informed scheduling. This reduces communication times, thereby reducing response times and providing for increased performance of the services and, therefore, the application.

Figure 3:
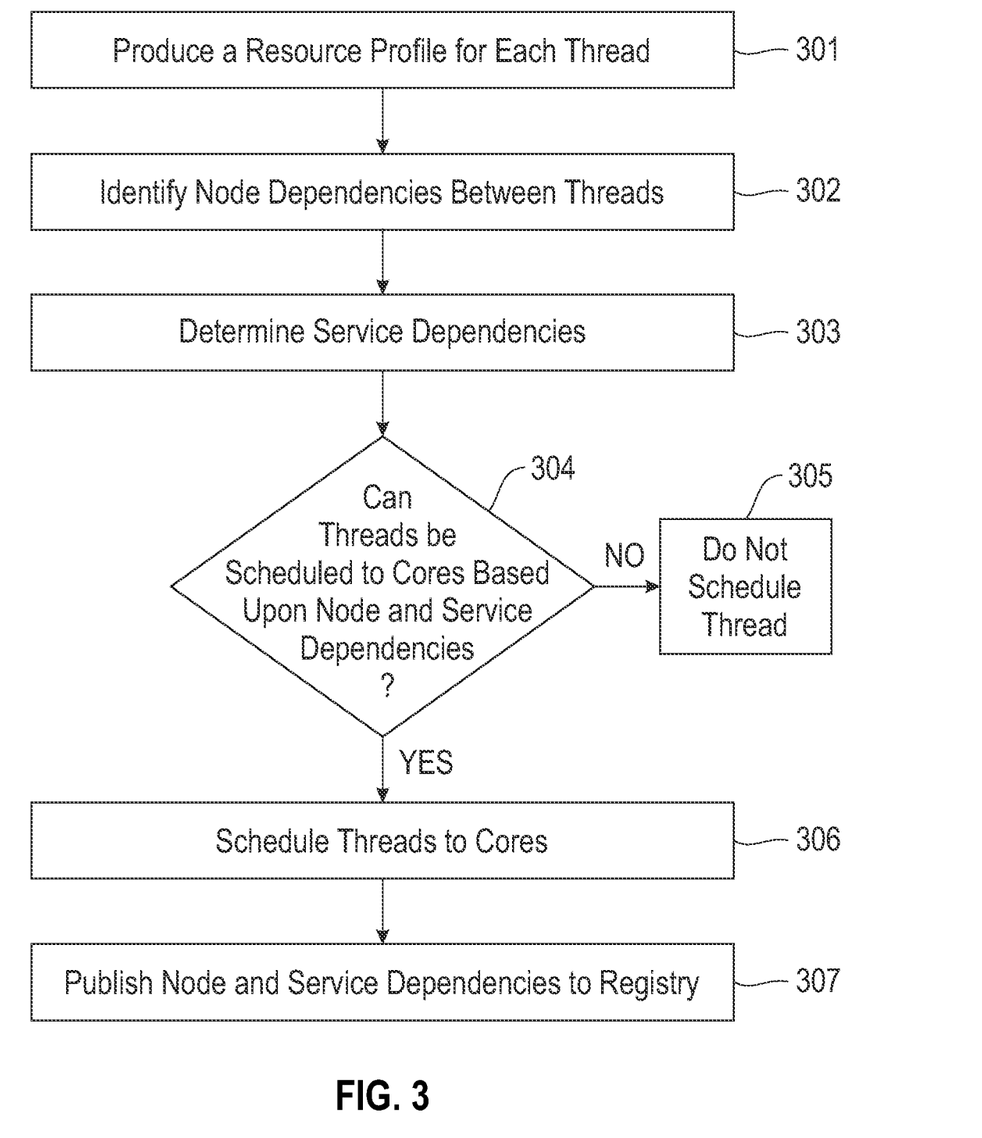
FIG. 3 illustrates a method of scheduling threads within nodes and associated with services to cores having resources for use by threads based upon identified container and service dependencies.

FIG. 3 illustrates a method for scheduling threads within containers and associated with services, to cores having resources for use by threads based upon identified container and service dependencies. The virtual environment (cloud computing environment, remote computing environment, etc.) has a plurality of containers that can be used for running services. The containers are assigned to nodes within node clusters by the virtual environment. Each service is assigned to one or more of the nodes on the virtual environment. Services may be split across nodes or containers, with one portion of the service being hosted on or assigned to one node or container and another portion of the service being hosted on or assigned to another node or container. Additional to the services and containers, the virtual environment includes cores which include or provide resources that can be used by services and, therefore, the containers. Each of the cores may have different resources or configuration of resources as compared to other cores. For example, one core may have more memory resources than another core and one core may have more processing resources than another core. It should be noted that some cores may have the same resource configuration as other cores and that cores may have multiple resources.

At 301 the system produces, for example, using a function-to-resource profiler, a resource profile for each thread in each container supporting a service of an application. An application, for example, a telecommunications application, firewalls, information management systems, intrusion detection systems, intrusion prevention systems, and the like, has many different services that perform functions of the application. Each of these services is assigned to a node and container within the virtual environment, meaning each container supports at least one service of the application. Within each container are threads that perform different functions allowing the application to run. In order to fulfill a service, many different threads communicate with each other. These threads may be within the same container and some of these threads may be on different containers. Each communication that occurs between threads has an associated communication time that can vary based upon different factors, with a big factor being a communication distance between different threads.

As a thread performs its function, it uses resources, for example, memory, processing, system calls, reads, writes, and the like. Since these resources are located on the cores, the threads have to work with the cores in order to use the required resource. Thus, a thread can only use as much of a resource that is available on its assigned core. Additionally, multiple threads are assigned to a single core, so the threads have to share resources of the core. Accordingly, it is beneficial to assign threads to cores so that the resources of the core are used in the most optimal manner. Thus, the system generates a resource profile for each thread of each container. To generate the resource profile, the system may monitor, for example, using a thread monitoring application, a thread counter application, or the like, the threads and collect metrics from the monitoring. These metrics identify what resources the thread is accessing. The metrics also identify at what amount the threads are using a particular resource.

From the resource profile, the system may identify resource indicators. A resource indicator indicates that a thread uses or accesses a resource at or above a predetermined threshold. In other words, a thread may be labeled as having a resource indicator if the thread uses the resource corresponding to the indicator above a particular threshold. The threshold may be set by the user, the system, a default value, or the like. Thus, resource indicators are simply a mapping of a thread and resource usage of the thread to a threshold. From the resource indicators, the system can create or teach a function-to-resource affinity classifier. As mentioned, each thread has a function and each thread, in performing the function, uses particular resources. Once it is identified what resources are used by a particular thread, the system can make a correlation between resource and functions. In other words, the system can make a correlation that a particular function would need particular resources in performing the function. Thus, the resource indicators and corresponding thread functions can be used to train an affinity classifier to learn these correlations.

Resource indicators may be direct resource indicators or indirect resource indicators. A direct resource indicator is an indicator where the resource represented by the indicator is monitored and triggers the indicator. For example, if memory usage is monitored and crosses a threshold to generate a memory resource indicator, that is a direct resource indicator. An indirect resource indicator is a resource indicator that corresponds to a resource identified from metrics or use of resources other than the resource corresponding to the resource indicator. For example, if system calls usage is monitored and crosses a threshold to generate a network resource indicator, that is an indirect resource indicator because system calls usage was used to generate a network resource indicator. Multiple indicators may be used for a single function. These multiple indicators may need to be combined into a single final indicator. To perform this combining the system may use heuristics to choose one or more of the indicators to select for or combine into the final indicator. Combining the heuristics may include using a function to generate the final indicator.

At 302 the system identifies for each of the containers and from, at least, the resource profiles, container dependencies between threads on the containers. This identification is performed on a container-by-container basis, meaning that the container dependencies will be identified based upon threads within a corresponding container and irrespective of threads outside the corresponding container. Thus, each container will have container dependencies identified from the threads on that container, thereby providing an intra-service dependency identification. The container dependencies may be identified directly from the resource profiles or may be identified indirectly from the resource profiles. For example, if the system generated resource indicators from the resource profiles, the container dependencies may be identified from the resource indicators.

The system may use additional or alternative information for identifying the container dependencies, for example, heuristics, spatial and temporal local references, monitors and counters, supervised learning, reinforcement learning, other machine learning, and the like. For example, the system may use low level monitors and counters to identify shared resources. As an example, the system could track memory virtual address accessed by functions within a service. The system could identify that multiple threads are accessing a single resource and, therefore, may be dependent threads. As another example, the system may use heuristics to learn inter-thread dependencies. As an example, a heuristic could reference locality where one thread is getting data from network followed by another thread processing that data, thereby identifying the threads as dependent. As another example, a heuristic could identify that two threads are accessing the same address space, thereby identifying the threads as dependent. Not only can the system identify thread dependencies, but it may also identify thread anti-dependencies which indicate that it would be detrimental to schedule or allocate two threads to the same core, container, node, or the like. For example, two threads that extensively use the same resource may be detrimental to allocate to the same core.

At 303 the system determines service dependencies between services across different of the containers. This identification identifies threads across containers that are dependent upon each other. Thus, this identification is an inter-container dependency identification. These inter or cross service dependencies are called service dependencies in order to distinguish them from the dependencies called container dependencies. However, it should be understood that these dependencies are similar except that container dependencies are thread dependencies within a single container and service dependencies are thread dependencies across or between different containers.

To learn or determine these service dependencies the system may use different techniques. Another technique for determining service dependencies is by utilizing application topologies. In some cases, the topologies are generated by the system or an application. Alternatively, the topologies may be accessed or retrieved from other sources, for example, the system corresponding to the application on the virtual environment may have a topology for the application. Topologies identify services within the application that are connected to each other in some way. Connections may include parent/child relationships, sibling relationships, and the like. These relationships can be leveraged to identify dependencies between services in the application. These dependencies can then be leveraged to identify those threads within the dependent services that perform the functions of the services that are connected. Alternatively, the system can get service dependency indicators, for example, from tracking requests, monitoring resource consumption, resource indicators, and the like, to generate a topology and then aggregating application topologies generated from the service dependency indicators.

When determining the service dependencies, the system may be able to easily identify dependencies between services. However, identifying the threads of the services that are dependent may be more difficult. For example, different of the topologies may provide an indication of service dependencies, but may not identify the threads performing the functions corresponding to the service dependencies. Accordingly, the system may employ a module that utilizes different techniques for identifying or inferring the thread dependencies that correlate to the service dependencies. Some techniques are similar to the technique for learning container dependencies, for example, monitoring resource consumption or using heuristics to identify shared resources. However, instead of identifying shared resources within a container as with the container dependencies, this identification is of shared resources across services or containers. By monitoring resource consumption or heuristics, the system can identify shared resources across services. Similar examples as discussed in connection with the container dependencies can be applied here except that instead of the threads being within the same containers, the threads are across containers or services. For example, the system can monitor resource consumption that occurs in response to communications between threads of different services, thereby indicating a possible service dependency between the services associated with the threads. Such techniques allow the system to derive dependencies between threads.

Another technique for determining service dependencies is to track or trace a request from start-to-finish and between services. By monitoring many requests, the system can start to generate and fill in a service dependency architecture. Tracking or tracing the request includes utilizing an application, for example, a monitoring, tracking, tracing, or the like, application, to track communications between threads of different services and then inferring service dependencies from the communications between the threads of the different services. The system may also employ a machine-learning model or other machine-learning technique to identify service dependencies. These machine-learning models or techniques may be trained using historical thread communication and resource indicator information.

Another technique for determining service dependencies is by utilizing application topologies. In some cases, the topologies are generated by the system or an application, for example, a cluster or container orchestrator, service mesh, or the like. Alternatively, the topologies may be accessed or retrieved from other sources, for example, the system corresponding to the application on the virtual environment may have a topology for the application. Topologies identify services within the application that are connected to each other in some way. Connections may include parent/child relationships, sibling relationships, and the like. These relationships can be leveraged to identify dependencies between services in the application. These dependencies can then be leveraged to identify those threads within the dependent services that perform the functions of the services that are connected. Alternatively, the system can get service dependency indicators, for example, from tracking requests, monitoring resource consumption, resource indicators, and the like, to generate a topology and then aggregating application topologies generated from the service dependency indicators.

At 304, the system determines if threads can be scheduled to cores based upon the container and service dependencies. The system may determine that threads cannot be scheduled because of conflicting requirements, cores cannot support a particular thread, or the like. If a thread cannot be scheduled, then the system may not schedule the thread at 305. If, on the other hand, the thread can be scheduled, the system may schedule threads to cores based upon or in view of the container and service dependencies, and in a manner that attempts to minimize thread processing and communication times at 306.

It is beneficial to schedule threads to cores in an optimal manner in order to reduce communication times between threads. Specifically, it is beneficial to schedule threads in a manner such that threads that would benefit from sharing resources are scheduled or allocated to the same core. Thus, the system is able to leverage the container and service dependencies to schedule threads to cores at 306 in order to minimize thread processing times. Scheduling may not include directly scheduling the threads. Rather, scheduling may include making indicators or thread dependency hints available to the thread scheduling system, for example, a thread-core allocator. The thread scheduling system can use the thread dependency hints when scheduling any threads to containers, nodes, and/or cores.

The system may use some of the information generated or captured in identifying container or service dependencies when scheduling threads to cores. For example, the system may use the resource indicators when assigning the threads. If a thread is identified as extensively using a resource, the system may identify a core that can support the extensive use of this resource, for example, a core having a resource configuration that provides as much of the resource identified by the resource indicator. Additionally, the system may take into account resource indicators, dependencies, or other information, of other threads in scheduling the threads. Since the system is trying to reduce communication times between threads, it will be detrimental to schedule threads to a single core that both extensively use the same resource. As discussed above, this may be an anti-dependency indicator. Thus, the system may use other thread information in scheduling threads.

The trained function-to-resource affinity classifier or other trained machine-learning models or techniques may be used when scheduling threads to cores. Specifically, since a function of the thread is known, the function can be fed to the classifier which would then identify which resource indicators are associated with the function and, therefore, the thread. These resource indicators can then be used to schedule or allocate the thread to a core that would support the resource indicators even though that particular thread has not been deployed, but because a thread having the same function has been deployed the system can accurately schedule the thread to a supporting core.

At 307 the system may publish the container and service dependencies on a registry of the node clusters. Other information may also be published on the registry, for example, resource indicators, thread scheduling, trained models, and the like. Since the registry is for the entire node cluster, any node within the cluster can access the registry information and use it in its own scheduling or for other uses. Additionally, the registry can be used as a central datastore for the function-to-resource profiler to enable training over a larger amount of data. The function-to-resource affinity classifier may also be updated or trained using the data on the registry, thereby providing more training information for the classifier, or a different machine-learning model or machine-learning technique. Thus, the registry allows for sharing of data across all nodes.

Figure 4:
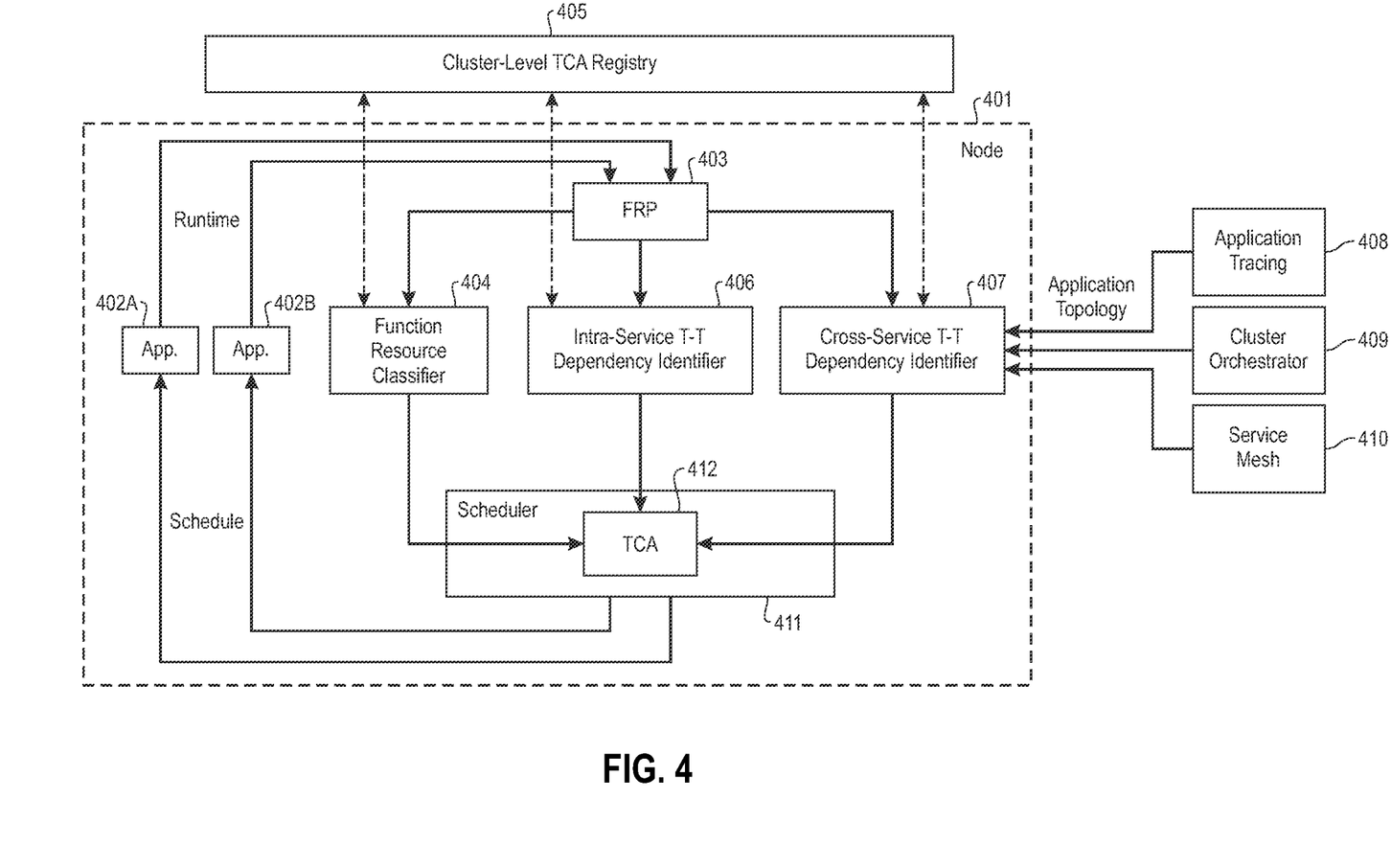
FIG. 4 illustrates an example overall system architecture for scheduling threads within nodes and associated with services to cores having resources for use by threads based upon identified container and service dependencies.

FIG. 4 illustrates an overall example of a system architecture for scheduling threads within nodes and associated with services to cores having resources for use by threads based upon identified container and service dependencies. At a node 401 within a virtual environment, the system learns information regarding container and service dependencies. One or more applications 402A and 402B are hosted on the node 401. A function-to-resource profiler (FRP) 403 generates a resource profile for the application(s) 402A and 402B. The resource profile may be used to train a function-to-resource classifier 404. From the resource profile, the system may identify intra-service dependencies (also referred to as container dependencies) using an intra-service T-T dependency identifier 406 and inter- or cross-service dependencies (also referred to as service dependencies) using a cross-service T-T dependency identifier 407. The cross-service T-T dependency identifier 407 may also utilize an application tracing module 408, cluster orchestrator module 409, service mesh module 410, and the like, to generate application topologies or otherwise identify service dependencies.

The container and service dependencies may be used by the scheduler 411 that may include other modules, for example, a thread-core allocator (TCA) 412, to schedule or otherwise allocate threads to cores, containers, and/or nodes. The scheduler 411 may also use the function-to-resource classifier 404 to assist in scheduling the threads. The scheduling may be performed in a manner that reduces the processing or communication times between threads in order to improve the performance of the application being hosted on the virtual environment. The container and service dependencies and the function-to-resource classifier information may be published to a cluster-level thread-core allocator registry 405 to be used by all nodes within a particular cluster.

Figure 5:
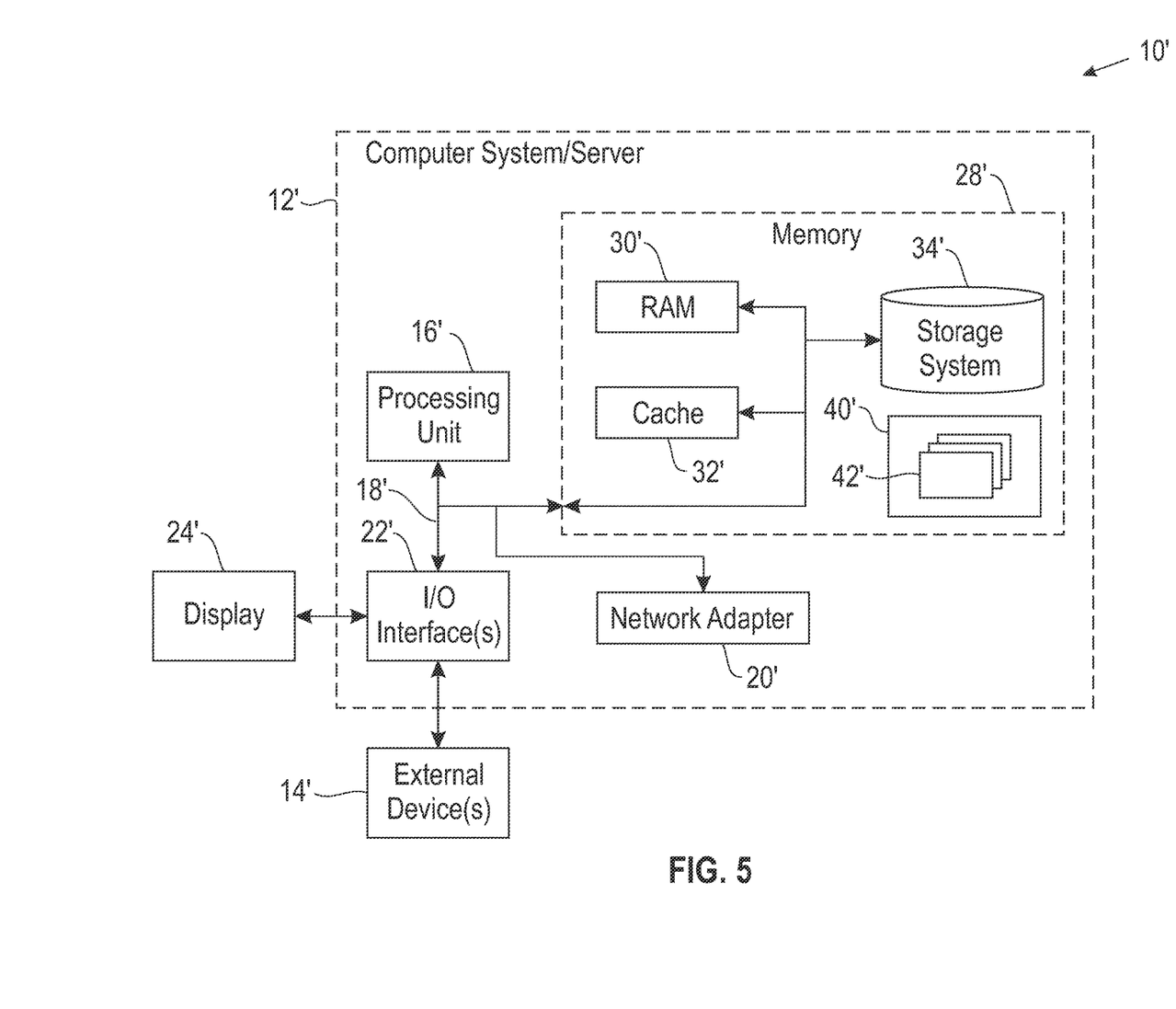
FIG. 5 illustrates a computer system.

As shown in FIG. 5, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
   producing, for each of a plurality of containers, a resource profile for each thread in each of the plurality of containers, the resource profile including at least one resource indicator to indicate that a thread utilizes a resource represented by the resource indicator above a threshold for determining a container dependency between the thread and other threads within a single container,
   wherein each thread is associated with an application hosted on a virtual environment, wherein subsets of the plurality of containers are associated with cores comprising resources for use by containers, wherein sets of containers are assigned to a node within a node cluster;
   identifying, for each of the plurality of containers and from, at least in part, resource indicators in the resource profiles, container dependencies between threads on a single of the plurality of containers;
   determining service dependencies between threads across different of the plurality of containers;
   scheduling, based upon the container dependencies and the service dependencies, threads to the cores, wherein the scheduling is based upon minimizing thread processing times; and
   publishing the container dependencies and the service dependencies on a registry of the node clusters.

2. The method of claim 1, wherein the resource indicators comprise at least one indirect resource indicator, wherein an indirect resource indicator comprises a resource indicator corresponding to a resource identified from metrics other than a direct metric of the resource.

3. The method of claim 1, wherein a plurality of the resource indicators map to a resource; and
   wherein the identifying resource indicators further comprises generating, using heuristics, a final resource indicator from the plurality of resource indicators.

4. The method of claim 1, wherein the identifying container dependencies further comprises utilizing spatial and temporal local references.

5. The method of claim 1, wherein the determining service dependencies further comprises tracking, utilizing a tracking application, communications between threads of different services and inferring service dependencies from the communications between the threads of different services.

6. The method of claim 1, wherein the determining service dependencies further comprises identifying resources shared among different services by monitoring resource consumption occurring in response to communications between threads of different services.

7. The method of claim 1, wherein the determining service dependencies further comprises generating application topologies from each of a plurality of service dependency indicators and aggregating application topologies from the plurality of service dependency indicators.

8. The method of claim 1, wherein the determining service dependencies further comprises utilizing a machine learning technique trained using historical thread communication and resource indicator information.

9. The method of claim 1, further comprising:
training a function-to-resource affinity classifier using the resource indicators to identify resources utilized by the function; and
identifying, using the function-to-resource affinity classifier, the resources utilized by the function to schedule corresponding threads to the cores.

10. An apparatus, comprising:
at least one processor; and
a computer readable storage medium having computer readable program code embodied therewith and executable by the at least one processor to:
produce, for each of a plurality of containers, a resource profile for each thread in each of the plurality of containers, the resource profile including at least one resource indicator to indicate that a thread utilizes a resource represented by the resource indicator above a threshold for determining a container dependency between the thread and other threads within a single container,
wherein each thread is associated with an application hosted on a virtual environment, wherein subsets of the plurality of containers are associated with cores comprising resources for use by containers, wherein sets of containers are assigned to a node within a node cluster;
identify, for each of the plurality of containers and from, at least in part, resource indicators in the resource profiles, container dependencies between threads on a single of the plurality of containers;
determine service dependencies between threads across different of the plurality of containers;
schedule, based upon the container dependencies and the service dependencies, threads to the cores, wherein the scheduling is based upon minimizing thread processing times; and
publish the container dependencies and the service dependencies on a registry of the node clusters.

11. A computer program product, comprising:
a computer readable storage medium having computer readable program code embodied therewith, the computer readable program code executable by at least one processor to:
produce, for each of a plurality of containers, a resource profile for each thread in each of the plurality of containers, the resource profile including at least one resource indicator to indicate that a thread utilizes a resource represented by the resource indicator above a threshold for determining a container dependency between the thread and other threads within a single container,
wherein each thread is associated with an application hosted on a virtual environment, wherein subsets of the plurality of containers are associated with cores comprising resources for use by containers, wherein sets of containers are assigned to a node within a node cluster;
identify, for each of the plurality of containers and from, at least in part, resource indicators in the resource profiles, container dependencies between threads on a single of the plurality of containers;
determine service dependencies between threads across different of the plurality of containers;
schedule, based upon the container dependencies and the service dependencies, threads to the cores, wherein the scheduling is based upon minimizing thread processing times; and
publish the container dependencies and the service dependencies on a registry of the node clusters.

12. The computer program product of claim 11, wherein the resource indicators comprise at least one indirect resource indicator, wherein an indirect resource indicator comprises a resource indicator corresponding to a resource identified from metrics other than a direct metric of the resource.

13. The computer program product of claim 11, wherein a plurality of the resource indicators map to a resource; and
wherein the computer readable program code executable by the at least one processor to identify the resource indicators is further executable by the at least one processor to:
generate, using heuristics, a final resource indicator from the plurality of resource indicators.

14. The computer program product of claim 11, wherein the computer readable program code executable by the at least one processor to identify the container dependencies is further executable by the at least one processor to:
utilize spatial and temporal local references.

15. The computer program product of claim 11, wherein the computer readable program code executable by the at least one processor to determine the service dependencies is further executable by the at least one processor to:
track, utilizing a tracking application, communications between threads of different services and inferring the service dependencies from the communications between the threads of different services.

16. The computer program product of claim 11, wherein the computer readable program code executable by the at least one processor to determine the service dependencies is further executable by the at least one processor to:
identify resources shared among different services by monitoring resource consumption occurring in response to communications between threads of different services.

17. The computer program product of claim 11, wherein the computer readable program code executable by the at least one processor to determine service dependencies is further executable by the at least one processor to:
generate application topologies from each of a plurality of service dependency indicators and aggregating application topologies from the plurality of service dependency indicators.

18. The computer program product of claim 11, wherein the computer readable program code executable by the at least one processor to determine service dependencies is further executable by the at least one processor to:
utilize a machine learning technique trained using historical thread communication and resource indicator information.

* * * * *